United States Patent
Sohajda et al.

(10) Patent No.: US 11,649,299 B2
(45) Date of Patent: May 16, 2023

(54) PURIFICATION OF SULFOBUTYLATED CYCLODEXTRINS WITH SPECIFIC ION EXCHANGE RESINS

(71) Applicant: CYCLOLAB CYCLODEXTRIN RESEARCH AND DEVELOPMENT LABORATORY LTD., Budapest (HU)

(72) Inventors: Tamas Sohajda, Halasztelek (HU); Gabriella Hirschbergne Szejtli, Budapest (HU); István Puskás, Budapest (HU)

(73) Assignee: CYCLOLAB CYCLODEXTRIN RESEARCH AND DEVELOPMENT LABORATORY LTD., Budapest (HU)

( * ) Notice: Subject to any disclaimer, the term of this patent is extended or adjusted under 35 U.S.C. 154(b) by 98 days.

(21) Appl. No.: 17/344,217

(22) Filed: Jun. 10, 2021

(65) Prior Publication Data

US 2022/0396641 A1 Dec. 15, 2022

(51) Int. Cl.
| | | |
|---|---|---|
| *C08B 37/16* | (2006.01) | |
| *C08B 37/00* | (2006.01) | |
| *B01J 39/05* | (2017.01) | |
| *B01J 41/05* | (2017.01) | |

(52) U.S. Cl.
CPC ............ *C08B 37/0012* (2013.01); *B01J 39/05* (2017.01); *B01J 41/05* (2017.01); *C08B 37/0003* (2013.01)

(58) Field of Classification Search
None
See application file for complete search history.

(56) References Cited

U.S. PATENT DOCUMENTS

| | | |
|---|---|---|
| 3,426,011 A | 2/1969 | Parmerter et al. |
| 2009/0270348 A1 | 10/2009 | Antle |
| 2010/0093663 A1 | 4/2010 | Antle |
| 2015/0045311 A1 | 2/2015 | Antle |
| 2015/0284479 A1 | 10/2015 | Antle et al. |
| 2017/0158781 A1 | 6/2017 | Antle et al. |
| 2018/0346609 A1 | 12/2018 | Antle et al. |

FOREIGN PATENT DOCUMENTS

| | | |
|---|---|---|
| CN | 102033115 A | 4/2011 |
| HU | 228 817 B1 | 5/2013 |
| WO | WO 94/02518 A1 | 2/1994 |

OTHER PUBLICATIONS

Kisilevsky et al., "Arresting amyloidosis in vivo using small-molecule anionic sulphonates or sulphates: implications for Alzheimer's disease", Nature Medicine, Feb. 1995, vol. 1, No. 2, pp. 143-148.
International Search Report (Form PCT/ISA/210) for International Application No. PCT/IB2022/055121, dated Sep. 2, 2022.
Written Opinion of the International Searching Authority (Form PCT/ISA/237) for International Application No. PCT/IB2022/055121, dated Sep. 2, 2022.

*Primary Examiner* — Layla D Berry
(74) *Attorney, Agent, or Firm* — Birch, Stewart, Kolasch & Birch, LLP (57) ABSTRACT

Present invention relates to a process to reduce butane sultone hydrolysis products (4-hydroxybutane-1-sulfonic acid, and bis(4-sulfobutyl) ether disodium) in sulfobutylether cyclodextrin reaction mixtures achieved with the combined use of a strong anion exchange resin having dialkyl 2-hydroxyethyl ammonium hydroxide functionality and a cation exchange resin.

8 Claims, 3 Drawing Sheets

Figure 3 ically structured, Type I strong base anion exchange resins in SBEBCD purification indicating the presence of 4-hydroxybutane-1-sulfonic acid below USP specification limit

PURIFICATION OF SULFOBUTYLATED CYCLODEXTRINS WITH SPECIFIC ION EXCHANGE RESINS

FIELD OF THE INVENTION

Present invention relates to a process to reduce butane sultone hydrolysis products (4-hydroxybutane-1-sulfonic acid, and bis(4-sulfobutyl) ether disodium) in sulfobutylether cyclodextrin reaction mixtures achieved with the combined use of a strong anion exchange resin having dialkyl 2-hydroxyethyl ammonium hydroxide functionality and a cation exchange resin.

BACKGROUND OF THE INVENTION

Cyclodextrins (CDs) are cyclic, non-reducing oligosaccharides which are made up of D-glucopyranose units of 4C conformation linked by α-(1,4) glycosidic bonds. The nomenclature of cyclodextrins reflects the number of the constituent glucose units: those comprising 6, 7, or 8 units are denoted as alpha-, beta-, or gamma-cyclodextrin, respectively. The glucopyranose units are forming a truncated cone surrounding a cavity. The interior of the molecule (cavity) is slightly apolar due to H-atoms and glycosidic O-atoms. The narrower rim of the truncated cone is formed by the primary-, while the wider rim is formed by the secondary OH-residues. Due to the polar character of the two rims, the cyclodextrins are well soluble in water (except for beta-cyclodextrin).

The practical use of cyclodextrins arise from that these molecules are able to bind hydrophobic molecules (guest molecules) inside their apolar cavity via physical (i.e. non-chemical) interaction. The chemical and physical characteristics of the guest molecules change upon inclusion complex formation (e.g. water solubility and stability), which might be utilized in various fields, such as pharmaceutics (e.g. increasing the absorption of drugs), food (stabilization of flavors and vitamins), cosmetics (stabilization of skincare agents), chemicals (preparation of aqueous paints).

Cyclodextrins comprise one primary and two secondary OH-residues per each glucose unit (altogether 18, 21 or 24 free OH-residue in each alpha-, beta-, or gamma-cyclodextrin, respectively), which enables the preparation of different derivatives extending the applicability of cyclodextrins. The cavity of cyclodextrins may be widened by substituting their OH-residues enabling the interaction with larger molecules.

Sulfoalkyl Derivatized Cyclodextrins

Sulfoalkylated cyclodextrins were first described by Parmerter (patent U.S. Pat. No. 3,426,011) in 1969 mainly as flocculant and paper industry auxiliary material. Stella et al. (patent application WO9402518) prepared sulfoalkylated cyclodextrins as formulating excipient for the purpose of pharmaceutical use due to their low toxicity and high water solubility. These derivatives are suitably used in parenteral and other pharmaceutical formulations.

The preparation of sulfoalkylated cyclodextrins is favorably conducted by using a native cyclodextrin, water as a solvent, strong base and an alkylating agent 1,4-butane sultone (1,2λ6-oxathiane-2,2-dione). Amongst the family of sulfoalkylether cyclodextrins sulfobutylether beta cyclodextrin (SBEBCD) has the widest practical use but present description further directs to the effective purification of sulfobutylether alfa cyclodextrin (SBEACD) and sulfobutylether gamma cyclodextrin (SBEGCD). In general, SBEACD, SBEBCD and SBEGCD can be synthesized according to the scheme shown in FIG. 1.

Amongst the family of sulfobutylether cyclodextrins, sulfobutylether beta cyclodextrin (often denoted as SBECD, SBEBCD referred as betadex sulfobutyl ether sodium in United States Pharmacopoeia or sulfobutylbetadex sodium in European Pharmacopoeia) has the highest relevance being an approved pharmacopoeial excipient. The quality requirements for pharmaceutical use of the substance are both discussed in United States Pharmacopoeial (USP) and European Pharmacopoeial (EP) monographs.

Figure 1:
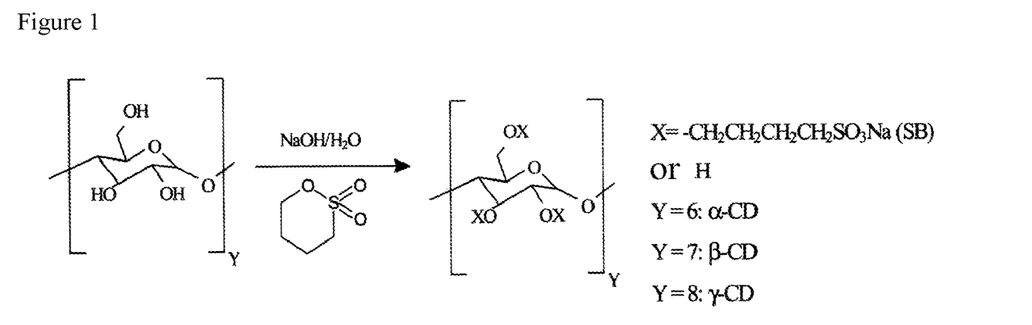
FIG. 1 shows the scheme of synthesis of sulfobutylether cyclodextrins

Upon the reaction yielding sulfobutyated cyclodextrin conducted according to the scheme in FIG. 1, hydrolysis products 4-hydroxybutane-1-sulfonic acid (and its sodium salt) and Bis(4-sulfobutyl) ether (disodium) form which need to be removed to meet USP monograph according to the following requirements:

Limit of 4-hydroxybutane-1-sulfonic acid: not more than 0.09%

Limit of bis(4-sulfobutyl) ether disodium: not more than 0.05%

Various methods are known in the art to remove hydrolysis products of 1,4-butane sultone from crude sulfoalkylether beta cyclodextrin reaction mixture including ultrafiltration, diafiltration, centrifugation, extraction, solvent precipitation. The methods are summarized in patent applications US2010093663, US2009270348, US2015045311, US2015284479, US2017158781, US20180346609, US2018346609. None of these documents have teachings about the possible use of ion exchange resins for removal of hydrolysis products of 1,4-butane sultone from the crude reaction mixture.

Hungarian patent HU228817 discloses the use of cation- and anion exchange resins to remove such hydrolysis products from crude SBEBCD synthesis mixture without specifying which type of the anion exchange resin is applicable for the effective removal of hydrolysis products of 1,4-butane sultone and whether there are differences in the efficacy of various available resin types. The attained impurity level is described to be lower than 0.1% in the patent description, therefore the resulting product produced accordingly the does not unambiguously meet USP quality requirements.

We have surprisingly found that not all commercially available anion exchange resins are suitable for said purpose and the selection of the suitable type of the anion exchange resin is not obvious. Under experimental conditions corresponding to the routine use applied by one skilled in the art, some commercially available anion exchange resins are unable to reduce the hydrolysis products under the USP requirement limits, while other products are performing adequately to reach the required parameter of SBEBCD, nevertheless to significantly different extent.

DETAILED DESCRIPTION

Via a systematic study, a thorough optimization for removal of 1,4-butane sultone hydrolysis products (4-hydroxybutane-1-sulfonic acid, and bis(4-sulfobutyl) ether disodium) was conducted via applying different anion exchange resin types. It was found that the character of the anion exchange resin applied had major influence on residual amount of 1,4-butane sultone hydrolysis products in the final product.

Various anion exchange resin types are available commercially. Strong base resins contain quaternary ammonium groups. Standard strong base ion exchange resins contain either —$N^+(CH_3)_3$ groups (type I resins) or —$N^+(CH_3)_2C_2H_4OH$ groups (type II resins). Those resins containing aromatic tertiary amine functionality are called weak base anion exchange resins. Most ion exchange resin variants are available on poly(styrene-co-divinylbenzene) and polyacrylate scaffolds, alike. Both weak and strong base ion exchange resins are available in gel-type or macroporous modifications.

We have surprisingly found that the reduction of butane sultone hydrolysis products in the acidified crude reaction mixture of sulfobutylated cyclodextrins (prepared according to Examples 1, 10 and 12 and subsequently partially purified by carbon treatment) may be achieved with significantly higher efficacy than that known in the art by using a mixed ion exchange resin composition comprising:

a.) a gel type anion exchange resin having dialkyl 2-hydroxyethyl ammonium hydroxide moieties (i.e. type II strong anion exchange resin) functionalized on a poly(styrene-co-divinylbenzene) scaffold.

b.) use of a cation exchange resin to remove counter ion $Na^+$

The purification scheme and the analysis method to assess resin performance are illustrated in Example 2 and the non-obvious, outstanding efficacy attained by of the optimal selection of the anion exchange resin (type Type II strong anion exchange resins (Poly(styrene-co-divinylbenzene) based, gel types) is demonstrated in Example 3 (for SBEBCD), Example 11 (for SBEACD) and Example 13 (for SBEGCD). The surprising outstanding removal efficacy of this class of resin (Type II strong anion exchange resins (Poly(styrene-co-divinylbenzene) based, gel type) may be attributed to the hydrogen bond forming ability of the resin functions necessary to bind the hydroxy acid or ether type of hydrolysis byproducts. A macroporous analogue of this type of resin in unable to discriminate the ionic oligomeric main product (sulfobutylether cyclodextrins) having average molecular weight of 2163 g/mol from the small molecule hydrolysis products (corresponding molecular weights: 4-hydroxy-1-butanesulfonic acid: 154.2 g/mol, bis(4-sulfobutyl) ether disodium: 334.3 g/mol) in a selective manner. Highly effective removal of these byproducts is paramount in pharmaceutical grade sulfobutylether cyclodextrin compositions, since these compounds do not have complexing (i.e. drug delivery) property, moreover bis(4-sulfobutyl) ether disodium may have unwanted pharmacological activity, such as inhibiting amyloid β peptide for modulating cerebral amyloid angiopathy demonstrated on various analogous compounds (Kisilevsky, R., et al.: Nature Med., 1, 143 (1995)). The necessity of keeping the hydrolysis byproduct levels low is further emphasized by the fact that the allowable daily dose of SBEBCD via intravenous route is up to an outstandingly high value amongst pharmaceutically applicable excipients: 300 mg/bodyweight kg.

Type II strong anion exchange resins (Poly(styrene-co-divinylbenzene) based, gel types) are available commercially—amongst others—under the following trade names:
Aldex: SB-2
Dow: Amberlite HPR 4100, Amberlite IRA 910, Amberlite HRP 4100
Dowex: Marathon A2, Upcore mono A2-500, MSA-2
Rohm&Haas: IRA-416, IRA-410, Amberjet 4010, IRA-910, Amberjet 4600
Thermax Tulsion: A-32, A-36
Lanxess/Lewatit: M-600, M-610, MP-600, Monoplus M 600
Purolite: A 200, A 250, A 300, A 850, A 510, A 860, PFA 200
Mitsubishi Diaion: SA20A, UBA200, PA418, PA412

Figure 2:
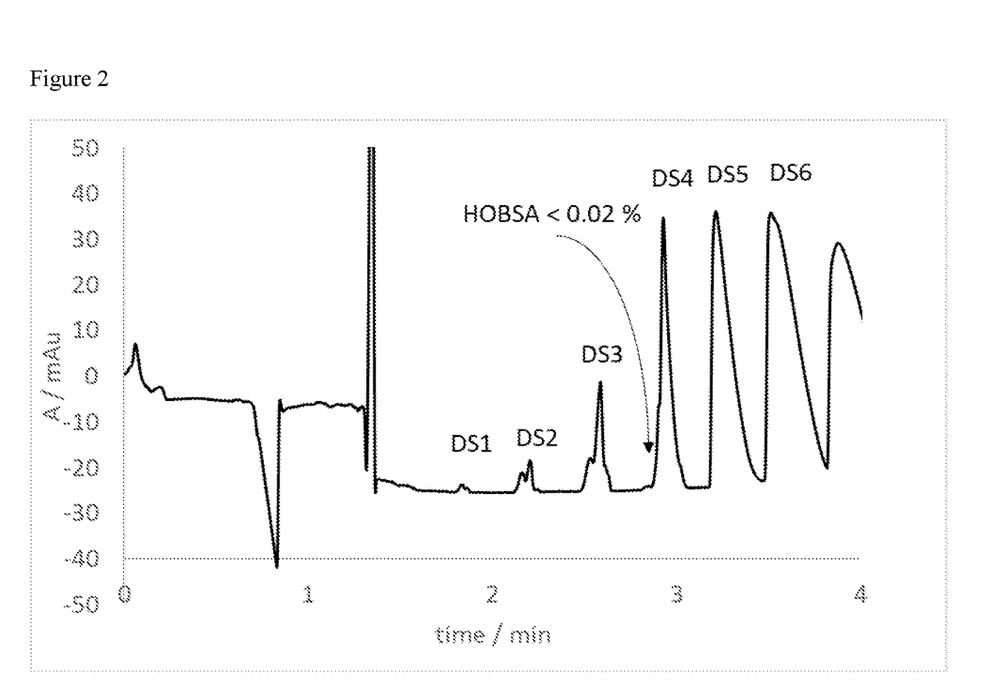
FIG. 2 depicts the capillary electropherogram performed according to Example 2 showing the efficacy of a representative, poly(styrene-co-divinylbenzene) based, gel structured, Type II strong base anion exchange resins in SBEBCD purification indicating the presence of 4-hydroxybutane-1-sulfonic acid below USP specification limit

FIG. 2 depicts the capillary electropherogram performed according to Example 2 showing the efficacy of a representative, poly(styrene-co-divinylbenzene) based, gel structured, Type II strong base anion exchange resin (Aldex SB-2) in SBEBCD purification indicating the presence of 4-hydroxybutane-1-sulfonic acid below USP specification limit.

The other non-obvious observation of the study is that the type of the cation exchange resin is not critical in relation to removal efficacy. Nevertheless, strong acid cation exchange resin of $H^+$-form is preferred (e.g. Purolite PPC100, Aldex C-800H LS, Amberlite HPR 1200H, Sunresin SC3100, Sunresin SC3200).

Type I strong base anion exchange gel structured resins on poly(styrene-co-divinylbenzene) scaffold are available commercially—amongst others—under the following trade names:
Aldex: SB-1
Amberlite FPA40
Bestion AT7000H
Diaion SA10A
Indion GS300
Lanxess ASB1P
Purolite PFA400
Resintech SBG1
Sunresin SA400
Thermax A23

The efficacy of these resins in SBEBCD purification is shown in Example 4.

Figure 3:
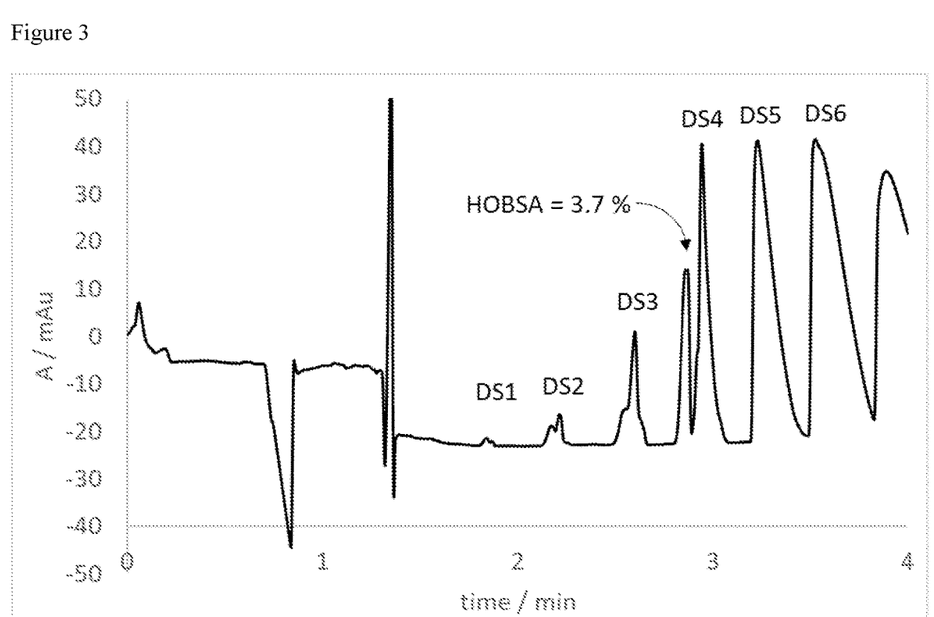
FIG. 3 shows the capillary electropherogram performed according to Example 2 showing the efficacy of a representative, poly(styrene-co-divinylbenzene) based, gel structured, Type I strong base anion exchange resin (Aldex SB1) in SBEBCD purification indicating the presence of 4-hydroxybutane-1-sulfonic acid over USP specification limit

FIG. 3 shows the capillary electropherogram performed according to Example 2 showing the efficacy of a representative, poly(styrene-co-divinylbenzene) based, gel structured, Type I strong base anion exchange resin (Aldex SB1) in SBEBCD purification indicating the presence of 4-hydroxybutane-1-sulfonic acid over USP specification limit.

Type I strong base macroporous anion exchange resins on poly(styrene-co-divinylbenzene) scaffold are available commercially—amongst others—under the following trade names:
Aldex SB-1 MP
Amberlite FPA90
Bestion BD201
Diaion PA308
Indion 8100H
Lanxess S5528
Purolite PFA500S
Resintech SBMP1 OH
Sunresin MA900
Thermax A72MP The efficacy of these resins in SBEBCD purification is shown in Example 5.

Type I strong base anion exchange resins (polyacrylate based gel type) are available—amongst others—commercially under the following trade names:
Doshion: DAAR 313
Rohm&Haas: FPA 98
Thermax: A-30MP
Lanxess: S-5428, S5528
Purolite: A 860

The efficacy of these resins in SBEBCD purification is shown in Example 6.

Type II strong base anion exchange resins (Poly(styrene-co-divinylbenzene) based macroporous types) are available commercially under the following trade names:
Aldex: SB-2 MP
Dow: Amberlite FPA22
Purolite: A 500
Bestion BD 202
Diaion PA 408
Indion 820

The efficacy of these resins in SBEBCD purification is shown in Example 7.

Weak base anion exchange resins (poly(styrene-co-divinylbenzene based gel types)—amongst others—are available commercially under the following trade names:
Aldex WB-1
Lewatit Ultrapure 123/MD
Purolite A172/4635

Weak base anion exchange resins (poly(styrene-co-divinylbenzene based macroporous types)—amongst others—are available commercially under the following trade names:
Aldex: WB-1 UPS, WB-1 HC
Amberlite FPA51
Bestion BCH-2

Weak base anion exchange resins (polyacrilic gel types)—amongst others—are available commercially under the following trade names:
Aldex WB2
Amberlite FPA55
Amberlite MPR6700
Bestion BA765
Doshion: DAAR 412

Weak base anion exchange resins (polyacrilic macroporous types)—amongst others—are available commercially under the following trade names:
Aldex CRA
Lewatit S5221
Lewatit A365
Purolite A835

The efficacies of the listed weak base ion exchange resins in SBEBCD purification are shown in Example 8.

Example 9 shows the efficacy of some specialty anion exchange resins (Amberlite FPA54 weak base phenolic resin, Purolite MPR1000 which is a mixture of acrylic and styrenic macroporous resins, Purolite S106 epoxy resin and Resintech SIR700 epoxypolyamine resin) which were all found unsuitable to bind 1,4-butane sultone hydrolysis products.

The data presented throughout Examples 3-9 show that effective removal of 1,4-butane sultone hydrolysis products can be achieved only by type II, strong anion exchange resin of styrenic gel structure, moderate efficacy was shown by type II, strong anion exchange resin of styrenic macroporous structure, while the use of other anion exchange resins in the panel tested resulted in poor separation results under the same conditions set earlier selected based on feasibility and economic features.

Present invention utilizing the pH-selective use of type II, strong anion exchange resin of styrenic gel structure, enable the removal of ionic hydrolyis byproducts. Compared with dialysis or ultrafitration such removal step is economic in terms of laborforce (the ion exchange resin treatment may be performed within 1 hour, whereas ultrafiltration may require typically one day) and reduced use of water needed (maximum 50% volume compared to the sulfobutylether cyclodextrin reaction mixture).

Sulfobutylether alpha-, beta- and gamma-cyclodextrins may be purified in present process disclosed, wherein the use of beta-CD is favored. SBEBCD produced by CycloLab Ltd, Hungary is marketed under the trade name Dexolve®.

The following examples are detailed for the illustration of the present invention without any limitation thereof.

EXAMPLE 1

Sulfobutylation Reaction of Beta Cyclodextrin

The applicability of the sulfobutylation reaction is illustrated herein in pilot plant scale. Table 1 shows the quantities and the molar ratios of the starting materials:

TABLE 1 starting materials for sulfobutylation of beta cyclodextrin

|  | mass (kg) | molar quantity (mol) | molar ratio |
|---|---|---|---|
| beta-cyclodextrin (of 12% hydrate content) | 37.9 | 33.37 (calculated on dry basis) | 1 |
| sodium hydroxide | 10.7 | 267.5 | 9.1 |
| 1,4-butane sultone | 33.6 | 246.8 | 8.4 |

Process:

Having 52.9 L water is weighed into a reactor, 37.9 kg beta-cyclodextrin hydrate is added during stirring at 25° C. in a rate that throughout the addition easily stirrable suspension is obtained. Then 10.7 kg sodium hydroxide is added in multiple portions, whilst the temperature rises to approximately 50-55° C. The liquid is heated to 60-62° C., then 33.63 kg (25.3 L) butane sultone is added cautiously within 30-60 minutes. During addition, in the initial period the temperature rises to 70-75° C. Throughout the addition, the temperature is kept in the range of 70-75° C. The funnel used is washed with 2×500 mL water. Having butane sultone added the temperature is kept constant in the range of 70-75° C., then 5 L 96% ethanol is added to the reaction mixture. The liquid is further stirred for 20 hours at 70-75° C., then the crude SBEBCD mixture is left to cool to ambient temperature (20-25° C.).

EXAMPLE 2

General Scheme of the Purification Process Using Cation and Anion Exchange Resins and Capillary Electrophoresis Method for Aanalysis of 1,4 Butane Sultone Hydrolysis Products The general scheme of purification process using the combination of cation and anion exchange resins is illustrated herein in pilot plant scale.

The reaction mixture obtained by Example 1 is processed by the following steps. Strong acid cation exchange resin being in H+-form (Aldex C-800H LS) is added to the reaction mixture of ambient temperature (20-25° C.) until the pH of the solution decreases to 2.5-3.0. The cation exchange resin is sieved, washed with 10 L purified water, then 5 kg activated carbon is added to the solution. The clarification step is performed for 3 hours at ambient temperature. The carbon is filtered, washed with 10 L water of suitable quality and an anion exchange resin is added to the filtrate to remove the 1,4 butane sultone originating, hydrolysis product impurities. The solution becomes strongly basic (pH≥12). Then, again, strong acid cation exchange resin being in H+-form (Aldex C-800H LS) is added to the liquid until the pH of the solution decreases to 2.5-3.0. Under these conditions, the mixture is stirred for 1 hour.

The ion exchange resin mixture bed is removed by sieving, washed with 10 L water, then the acidic solution is clarified with 5 kg activated carbon. The carbon is filtered, washed with 10 L purified water, then the clarification step is performed two more times.

The pH of the carbon-free solution is set to 5.5-6.5, then the solvent is removed by methods known from the art (evaporation, drum drying, lyophilisation and spray drying). 45 kg of product is obtained (yield: 73%). The typical average degree of substitution (DS) is 6.5, butane sultone content is <1 ppm, ethanol content is <5000 ppm, the contents of 4-hydroxybutane-1-sulfonic acid and bis(4-sulfobutyl) ether disodium vary by the type of the anion exchange resin used as analysed by the following capillary electrophoresis methods:

Capillary Electrophoretic Determination of 4-hydroxybutane-1-sulfonic acid (Referenced as HOBSA) Content:

Equipment: Agilent 7100 Capillary Electrophoresis equipped with diode array detector (Waldbronn, Germany) Agilent Chem Station/Openlab software Capillary: Uncoated fused-silica capillaries 33.5 cm (25 cm effective length)×50 μm I.D. (375 μm O.D.)

Reagents:
Water, Millipore Synergy quality (prepared freshly)
Sulfobutyl-ether-β-cyclodextrin sodium salt primary standard (Code: SBECD-WS)
4-hydroxy-1-butanesulfonic acid working standard (Code: HOBSA-WS)
Toluene-4-sulfonic acid monohydrate (pTSA, GR for analysis, Merck)
Tris(hydroxymethyl)aminomethane (TRIS, GR for analysis buffer substance, Merck)
Sodium hydroxide (pellets GR for analysis, Merck)

Buffer:
30 mM pTSA/60 mM TRIS with pH 8.2

Buffer Preparation:
Weigh 143 mg of pTSA and 182 mg of TRIS into a 25 ml graduated flask and made up to the mark with water at room temperature. Check the pH; it must be between 8.0 and 8.3. Filter through the solution on a 0.22 μm membrane and store in closed flask.

3. Experimental Parameters:
Conditioning:
Beginning of the work (on each day) the capillary is washed with water for one minute, followed by 1 M NaOH for ten minutes, 0.1 M NaOH for three minutes and again water for one minute.

Preconditioning:
Capillary is flushed before each analysis with water, 0.1 M NaOH, and again with water for 1-minute periods and finally with the operating buffer for 2.5 min.

Vials:
For washing and operating solutions or liquids glass vials (2 ml) are applied, filled to one ml. More pairs of operating buffers are placed in the instrument, and the operating buffer pairs are changed to new ones after NMT 20 runs.

Injection: 50 mbar*4 s
Temperature: 25° C.
Voltage: +20 kV
Indirect Detection: Sample: 350 nm/20 nm
Reference: 225 nm/20 nm
Peak width: >0.03
Response time: >0.3 s
Running time: 4 minutes for samples and calibrations as well Sample Set Runs:

| Sample | No. injections |
|---|---|
| Blank | 1 |
| SST1 | 1 |
| SST2 (Calibration Standard Solution) | 5 |
| Control Calibration Standard Solution_1 | 1 |
| Sample 1/1 | 1 |
| Sample 1/2 | 1 |
| Sample 1/3 | 1 |
| Sample 2/1 | 1 |
| Sample 2/2 | 1 |
| Sample 2/3 | 1 |
| Control Calibration Standard Solution_2 | 1 |
| SST1 | 1 |
| SST2* | 1 |

*SST2 shall only be performed for sequences exceeding 12 hours. In this case, recovery, compared to the average value of the five initial SST2 runs should be calculated, which should fall within 90-110%.

Sample Preparation
Sample Solvent
The sample solvent is water, prepared freshly.
Reference Stock Solution of HOBSA-WS
Prepare Reference Stock Solution of HOBSA-WS by weighing and transferring approximately 10 mg HOBSA-WS into a 10 ml volumetric flask and dissolve in the Sample Solvent (1 mg/ml). This solution is used for preparation of Calibration Standard Solutions.

Prepare also a Reference Control Stock Solution of HOBSA-WS similar way, this solution is used for preparation of Control Calibration Standard Solutions.

Calibration Standard Solutions:
Prepare Calibration Standard Solution by accurately weighing and transferring ~50 mg of SBECD working standard into 5 ml volumetric flasks and dissolve in the Sample Solvent. Add 50 μl of Reference Stock Solution of HOBSA-WS and fill to the mark with the Sample Solvent. This solution will also serve as SST2 solution to tests repeatability.

Prepare also a Control Calibration Standard Solution by accurately weighing and transferring ~50 mg SBECD working standard into 5 ml volumetric flasks and dissolve in the Sample Solvent. Add 50 μl of Reference Control Stock Solution of HOBSA-WS and fill to the mark with the Sample Solvent.

Sample Solution—In-Process Sample
The concentration of the sample is about 25 m/m % (the accurate SBECD concentration of GYK2-CE determined by HPLC or by the weight/volume calibration line), it has to be diluted to 25 fold (measure 200 μl in 5 ml graduated flask and fill up with water to the mark). Make 3 parallel sample preparations.

Sample Preparation from Solid SBECD:

The end-product SBECD solid sample is white powder. Weigh approximately 50 mg SBECD sample in 5 ml graduated flask and fill up with water to the mark. Make 3 parallel solutions.

5. SST

SST1

SBECD+HOBSA at LOQ level (10 mg/ml SBECD+0.004 mg/ml HOBSA solution)

Prepare SST1 solution by weighing and transferring approx. 50 mg SBECD-WS into a 5 ml volumetric flask and dissolve in the Sample Solvent. Add 20 µl of Reference stock solution of HOBSA-WS and fill to the mark with the Sample Solvent.

SST2

Calibration Standard Solution. The first parallel of the SST2 samples serve as calibration sample.

System Suitability:

Blank (Water):

Acceptance Criterion:

There is no peak or baseline deformation in the migration region of HOBSA on the electropherogram of blank sample SST1: to Check the Sensitivity of the System Acceptance Criterion:

$S/N \geq 2$ for HOBSA peak (calculated with Agilent ChemStation/Openlab Software—not equivalent to pharmacopeial calculation)

SST2: to Test the Separation of Components and the Precision of the System

Acceptance Criteria:

RSD (n=5) NMT 5% for the corrected peak area of HOBSA peak on the electropherograms (for in-process samples n=3 is sufficient)

The resolution (Rs) between HOBSA and the IV peak of SBECD is NLT 1.5

Calculation

The HOBSA content is calculated with the Agilent ChemStation/Openlab Software by external standard method with HOBSA one point calibration curve. During the determination of the accurate HOBSA concentration of the calibration samples, the purity (P) of the standard (determined by CE, display on the CoA) and the actual water content (WC, %) of HOBSA (determined by KF) has to be considered by applying a factor (f, f≈1). The theoretical HOBSA concentration has to be divided by (f) to determine the accurate concentration of the calibration sample.

$$(f)=1/[(100-WC)*P]*100$$

The calibration curve is calculated with the Agilent ChemStation/Openlab Software by "Linear" curve type (Origin: Force, Weight: Equal). The basis of the calibration and all calculations are the Corrected Peaks Areas calculated by the Software based on peak areas and migration times. As a basis of the calibration, the average corrected peak areas of all five Calibration Standard Solutions has to be applied. In case the peak area of the samples is lower than the one corresponding to LOQ level (SST1 sample), running the control calibration sample is not necessary. As a result, "below LOQ level" can be declared.

The accuracy of the calibration is controlled by running the Control Calibration Standard Solution. The calibration is accepted if the Recovery of HOBSA for the control sample (calculated according to the calibration) is within 90 to 110%. The recovery is calculated according to the following formula:

Recovery=measured conc./calculated conc.*100

In case the sequence exceeds 12 hours, Calibration Standard Solution (SST2) has to be retested at the end of the sequence and recovery as above with the same requirement has to be evaluated.

Capillary Electrophoretic Determination of bis(4-sulfobutyl) ether disodium (Referenced as DIBSA) Content:

Equipment: Agilent 7100 Capillary Electrophoresis equipped with diode array detector (Waldbronn, Germany) Agilent Chem Station/Openlab software Capillary: Uncoated fused-silica capillaries 33.5 cm (25 cm effective length)×50 µm I.D. (375 µm O.D.)

Reagents:

Water, Millipore Synergy quality (prepared freshly)

Sulfobutyl-ether-β-cyclodextrin sodium salt primary standard (Code: SBECD-WS)

bis(4-sulfobutyl) ether disodium (Code: DIBSA-WS)

1,3-diaminopropane (Code: DAP, Sigma)

Tris(hydroxymethyl)aminomethane (Code: TRIS, Merck)

1,2,4-benzenetricarboxylic acid (Code: BTK, Sigma)

Sodium hydroxide (pellets GR for analysis, Merck)

Buffer:

7.5 mM DAP/10 mM TRIS pH adjusted to 8.0 with BTK

Buffer Preparation:

Weigh 30 mg of TRIS and 100 µl of DAP stock solution (weigh accurately and transfer approximately 0.685 g of DAP into a 5 ml graduated flask and fill up to mark with water) into a 25 ml graduated flask. Adjust the pH with BTK stock solution (weigh 50 mg BTK into a 5 ml graduated flask and fill up to mark with water) to 8.0 and fill up to the mark with water at room temperature. Filter through the solution on a 0.45 µm membrane and store in closed flask.

1. Experimental Parameters:

Conditioning:

Beginning of the work (on each day) the capillary is washed with water for one minute, followed by 1 M NaOH for ten minutes, 0.1 M NaOH for three minutes and again water for one minute.

Preconditioning:

Capillary is flushed before each analysis with water, 0.1 M NaOH, and again with water for 1-minute periods and finally with the operating buffer for 2.5 min.

Vials:

For washing and operating solutions or liquids glass vials (2 ml) are applied, filled to one ml. More pairs of operating buffers are placed in the instrument, and the operating buffer pairs are changed to new ones after 20 runs.

Infection: 50 mbar*4 s

Temperature: 25° C.

Voltage: −20 kV

Indirect Detection: Sample: 350 nm/20 nm

Reference: 225 nm/20 nm

Peak width: >0.03

Response time: >0.3 s

Running time: 6 min for samples and calibrations as well

Sample Set Runs:

| Sample | No. injections |
| --- | --- |
| Blank | 1 |
| SST1 | 1 |
| SST2 (Calibration Standard Solution) | 5 |
| Sample 1/1 | 1 |
| Sample 1/2 | 1 |
| Sample 1/3 | 1 |
| Sample 2/1 | 1 |
| Sample 2/2 | 1 |
| Sample 2/3 | 1 |

-continued

| Sample | No. injections |
|---|---|
| Control Calibration Standard Solution | 1 |
| SST1 | 1 |
| SST2* | 1 |

*SST2 shall only be performed for sequences exceeding 12 hours. In this case, recovery, compared to the average value of the five initial SST2 runs should be calculated, which should fall within 90-110%.

Sample Preparation

Sample Solvent

The sample solvent is water, prepared freshly.

Reference Stock Solution of DIBSA

Prepare Reference Stock Solution of DIBSA by weighing and transferring approximately 10 mg DIBSA-WS into a 10 ml volumetric flask and dissolve in the Sample Solvent (1 mg/ml). This solution is used for preparation of Calibration Standard Solutions.

Prepare also a Reference Control Stock Solution of DIBSA similar way, this solution is used for preparation of Control Calibration Standard Solutions.

Calibration Standard Solutions:

Prepare Calibration Standard Solution by accurately weighing and transferring 50 mg of SBECD working standard into 5 ml volumetric flasks and dissolve in the Sample Solvent. Add 50 µl of Reference Stock Solution of DIBSA, respectively, and fill to the mark with the Sample Solvent. This solution will also serve as SST2 solution to tests repeatability.

Prepare also a Control Calibration Standard Solution by accurately weighing and transferring 50 mg SBECD working standard into 5 ml volumetric flasks and dissolve in the Sample Solvent. Add 50 µl of Reference Control Stock Solution of DIBSA, and fill to the mark with the Sample Solvent.

Sample Solution—In-Process Sample

The concentration of the sample is about 25 m/m % (the accurate SBECD concentration of GYK2-CE determined by HPLC or by the weight/volume calibration line), it has to be diluted to 25 fold (measure 200 µl in 5 ml graduated flask and fill up with water to the mark). Make 3 parallel sample preparations.

Sample Preparation from Solid SBECD:

The end-product SBECD solid sample is white powder. Weigh accurately 50 mg SBECD sample in 5 ml graduated flask and fill up with water to the mark. Make 3 parallel solutions.

2. SST

SST1

SBECD+DIBSA at LOQ level (10 mg/ml SBECD+0.004 mg/ml DIBSA solution) Prepare SST1 solution by weighing and transferring approx. 50 mg SBECD working standard into a 5 ml volumetric flask and dissolve in the Sample Solvent. Add 20 µl of Reference stock solution of DIBSA and fill to the mark with the Sample Solvent.

SST2

Calibration Standard Solution. The first parallel of the SST2 samples serve as calibration sample.

Blank (Water):

Acceptance Criterion:

There is no peak or baseline deformation in the migration region of DIBSA on the electropherogram of blank sample SST1: to Check the Sensitivity of the System Acceptance Criterion:

S/N≥3 for DIBSA peak (calculated with Agilent ChemStation/Openlab Software—not equivalent to pharmacopeial calculation)

SST2: to Test the Precision of the System

Acceptance Criterion:

RSD (n=5) NMT 10% for the corrected peak area of DIBSA peak on the electropherograms (see FIG. 1). For in-process samples n=3 is sufficient.

Calculation

The DIBSA content is calculated with the Agilent ChemStation/Openlab Software by external standard method with DIBSA one point calibration curve. During the determination of the accurate DIBSA concentration of the calibration samples the purity (P) of the standard (determined by CE, display on the CoA) and the actual water content (WC, %) of DIBSA (determined by KF) has to be considered by applying a factor (f, f≈1). The theoretical DIBSA concentration has to be divided by (f) to determine the accurate concentration of the calibration sample.

$$(f)=1/[(100-WC)*P]*100$$

The calibration curve is calculated with the Agilent ChemStation/Openlab Software by "Linear" curve type (Origin: Force, Weight: Equal) The basis of the calibration and all calculations are the Corrected Peaks Areas calculated by the Software based on peak areas and migration times. As a basis of the calibration, the average corrected peak areas of all five Calibration Standard Solutions has to be applied. In case the peak area of the samples is lower than the one corresponding to LOQ level (SST1 sample), running the control calibration sample is not necessary. As a result, "below LOQ level" can be declared.

The accuracy of the calibration is controlled by running the Control Calibration Standard Solution. The calibration is accepted if the Recovery of DIBSA for the control sample (calculated according to the calibration) is within 90 to 110%. The recovery is calculated according to the following formula:

$$Recovery=measured\ conc./calculated\ conc.*100$$

In case the sequence exceeds 12 hours, Calibration Standard Solution (SST2) has to be retested at the end of the sequence and recovery as above with the same requirement has to be evaluated.

EXAMPLE 3

Purification Process of SBEBCD Using Poly(styrene-co-divinylbenzene) Based, Gel Structured, Type II Strong Anion Exchange Resin The applicability of the purification process using the optimally selected ion exchange resin type is illustrated herein. The reaction mixture was prepared according to Example 1 and purified according to general scheme shown in Example 2 using different poly(styrene-co-divinylbenzene) based, gel structured, Type II strong anion exchange resins sourced from different suppliers. The results of analysis on the contents of 4-hydroxybutane-1-sulfonic acid and bis(4-sulfobutyl) ether disodium contents in the final product is shown in Table 2

TABLE 2

Efficacy of poly(styrene-co-divinylbenzene) based, gel structured, Type II strong base anion exchange resins in SBEBCD purification

| Resin used | 4-hydroxybutane-1-sulfonic acid content | | bis(4-sulfobutyl) ether disodium content | |
|---|---|---|---|---|
| | content (%) | USP compliance | content (%) | USP compliance |
| Aldex SB-2* | <0.02%* | Yes | <0.02% | Yes |
| Dow Amberlite HPR 4100 | <0.02% | Yes | <0.02% | Yes |
| Dow Amberlite IRA 910 | <0.02% | Yes | <0.02% | Yes |
| Dow Amberlite HRP 4100 | <0.02% | Yes | <0.02% | Yes |
| Dowex Marathon A2 Upcore | <0.02% | Yes | <0.02% | Yes |
| Dowex mono A2-500 | <0.02% | Yes | <0.02% | Yes |
| Dowex MSA-2 | <0.02% | Yes | <0.02% | Yes |
| Rohm&Haas IRA-416 | <0.02% | Yes | <0.02% | Yes |
| Rohm&Haas IRA-410 | <0.02% | Yes | <0.02% | Yes |
| Rohm&Haas Amberjet 4010 | <0.02% | Yes | <0.02% | Yes |
| Rohm&Haas IRA-910 | <0.02% | Yes | <0.02% | Yes |
| Rohm&Haas Amberjet 4600 | <0.02% | Yes | <0.02% | Yes |
| Thermax Tulsion A-32 | <0.02% | Yes | <0.02% | Yes |
| Thermax Tulsion A-36 | <0.02% | Yes | <0.02% | Yes |
| Lanxess M-600 | <0.02% | Yes | <0.02% | Yes |
| Lanxess M-610 | <0.02% | Yes | <0.02% | Yes |
| Purolite A 200 | <0.02% | Yes | <0.02% | Yes |
| Purolite A 250 | <0.02% | Yes | <0.02% | Yes |
| Mitsubishi Diaion SA20A | <0.02% | Yes | <0.02% | Yes |
| Mitsubishi Diaion PA412 | <0.02% | Yes | <0.02% | Yes |

*Capillary electropherogram is shown in FIG. 2

EXAMPLE 4

Purification Process of SBEBCD Using Poly(styrene-co-divinylbenzene) Based, Gel Structured, Type I Strong Anion Exchange Resin The evidence of non-compliance of Type I gel structured, strong anion exchange resins sourced from different suppliers in the purification process is evidenced herein. The reaction mixture was prepared according to Example 1 and purified according to general scheme shown in Example 2 using different poly(styrene-co-divinylbenzene) based, gel structured, Type I strong anion exchange resins sourced from different suppliers. The results of analysis on the contents of 4-hydroxybutane-1-sulfonic acid and bis(4-sulfobutyl) ether disodium contents in the final product is shown in Table 3

TABLE 3

Efficacy of poly(styrene-co-divinylbenzene) based, gel structured, Type 1 strong base anion exchange resins in SBEBCD purification

| Resin used | 4-hydroxybutane-1-sulfonic acid content | | bis(4-sulfobutyl) ether disodium content | |
|---|---|---|---|---|
| | content (%) | USP compliance | content (%) | USP compliance |
| Aldex SB-1 | 3.7%* | No | 2.5% | No |
| Amberlite FPA40 | 4.9% | No | 0.9% | No |
| Bestion AT700OH | 3.8% | No | 1.6% | No |
| Diaion SA10A | 6.7% | No | 1.9% | No |
| Indi on GS300 | 4.8% | No | 2.3% | No |
| Lanxess ASB1P | 5.5% | No | 2.2% | No |
| Purolite PFA400 | 4.9% | No | 1.1% | No |
| Resintech SBG1 | 5.1% | No | 2.1% | No |
| Sunresin SA400 | 6.0% | No | 1.3% | No |
| Thermax A23 | 5.3% | No | 1.8% | No |

*Capillary electropherogram is shown in FIG. 3

EXAMPLE 5

Purification Process of SBEBCD Using Poly(styrene-co-divinylbenzene) Based, Macroporous, Type I Strong Anion Exchange Resin The evidence of non-compliance of macroporous Type I strong anion exchange resins sourced from different suppliers in the purification process is evidenced herein. The reaction mixture was prepared according to Example 1 and purified according to general scheme shown in Example 2 using different poly(styrene-co-divinylbenzene) based, macroporous, Type I strong anion exchange resins sourced from different suppliers. The results of analysis on the contents of 4-hydroxybutane-1-sulfonic acid and bis(4-sulfobutyl) ether disodium contents in the final product is shown in Table 4

TABLE 4

Efficacy of poly(styrene-co-divinylbenzene) based, macroporous, Type 1 strong base anion exchange resins in SBEBCD purification

| Resin used | 4-hydroxybutane-1-sulfonic acid content | | bis(4-sulfobutyl) ether disodium content | |
|---|---|---|---|---|
| | content (%) | USP compliance | content (%) | USP compliance |
| Aldex SB-1 MP | 6.4 | No | 2.4 | No |
| Amberlite FPA90 | 5.9 | No | 1.2 | No |
| Bestion BD201 | 5.8 | No | 1.6 | No |
| Diaion PA308 | 4.8 | No | 1.4 | No |
| Indion 810OH | 6.0 | No | 2.3 | No |
| Lanxess S5528 | 3.5 | No | 1.8 | No |
| Purolite PFA500S | 4.1 | No | 1.4 | No |
| Resintech SBMPl OH | 3.6 | No | 1.8 | No |
| Sunresin MA900 | 5.4 | No | 2.3 | No |
| Thermax A72MP | 3.6 | No | 1.7 | No |

EXAMPLE 6

Purification Process of SBEBCD Using Polyacrilate Based, Gel Structured, Type I Strong Anion Exchange Resin The evidence of non-compliance of gel structured polyacrylate based, Type I strong anion exchange resins sourced from different suppliers in the purification process is evidenced herein. The reaction mixture was prepared according to Example 1 and purified according to general scheme shown in Example 2 using different polyacrylate based, gel structured, Type I strong anion exchange resins sourced from different suppliers. The results of analysis on the contents of 4-hydroxybutane-1-sulfonic acid and bis(4-sulfobutyl) ether disodium contents in the final product is shown in Table 5.

TABLE 5

Efficacy of polyacrylate based, gel structured, Type 1 strong base anion exchange resins in SBEBCD purification

| Resin used | 4-hydroxybutane-1-sulfonic acid content | | bis(4-sulfobutyl) ether disodium content | |
|---|---|---|---|---|
| | content (%) | USP compliance | content (%) | USP compliance |
| Doshion DAAR 313 | 6.4 | No | 2.4 | No |
| Rohm&Haas FPA 98 | 7.4 | No | 2.6 | No |
| Thermax A-30MP | 5.5 | No | 2.2 | No |
| Lanxess S-5428 | 4.9 | No | 2.1 | No |
| Purolite A 860 | 7.3 | No | 2.9 | No |

EXAMPLE 7

Purification Process of SBEBCD Using Type II Strong Base Macroporous Structure Anion Exchange Resins on Poly(styrene-co-divinylbenzene) Scaffold The evidence of inferior efficacy of macroporous Type II strong anion exchange resins as compared to gel types of same class of resins sourced from different suppliers in the purification process is evidenced herein. The reaction mixture was prepared according to Example 1 and purified according to general scheme shown in Example 2 using different poly(styrene-co-divinylbenzene) based, macroporous, Type II strong anion exchange resins sourced from different suppliers. The results of analysis on the contents of 4-hydroxybutane-1-sulfonic acid and bis(4-sulfobutyl) ether disodium contents in the final product is shown in Table 6

TABLE 6

Efficacy of poly(styrene-co-divinylbenzene) based, macroporous, Type II strong base anion exchange resins in SBEBCD purification

| Resin used | 4-hydroxybutane-1-sulfonic acid content | | bis(4-sulfobutyl) ether disodium content | |
|---|---|---|---|---|
| | content (%) | USP compliance | content (%) | USP compliance |
| Aldex: SB-2 MP | 0.08 | Yes | 0.04 | Yes |
| Dow: Amberlite FPA22 | 0.08 | Yes | 0.04 | Yes |
| Purolite: A 500 | 0.07 | Yes | 0.04 | Yes |
| Bestion BD 202 | 0.08 | Yes | 0.04 | Yes |
| Diaion PA 408 | 0.07 | Yes | 0.04 | Yes |
| Indion 820 | 0.06 | Yes | 0.03 | Yes |

EXAMPLE 8

Purification Process of SBEBCD Using Weak Anion Exchange Resin

The evidence of non-compliance of different type of weak anion exchange resins sourced from different suppliers in the purification process is evidenced herein. The reaction mixture was prepared according to Example 1 and purified according to general scheme shown in Example 2 using different weak base anion exchange resins sourced from different suppliers. The results of analysis on the contents of 4-hydroxybutane-1-sulfonic acid and bis(4-sulfobutyl) ether disodium contents in the final product is shown in Table 7.

TABLE 7

Efficacy of weak base anion exchange resins in SBEBCD purification

| Resin brand | Resin type | 4-hydroxybutane-1-sulfonic acid content | | bis(4-sulfobutyl) ether disodium content | |
|---|---|---|---|---|---|
| | | content (%) | USP compliance | content (%) | USP compliance |
| Aldex WB-1 | PS/DVB*, gel | 6.4 | No | 2.4 | No |
| Lewatit U.pure 123/MD | PS/DVB*, gel | 5.8 | No | 2.2 | No |
| Purolite Al72/4635 | PS/DVB*, gel | 4.9 | No | 2.6 | No |
| Aldex WB-1 UPS | PS/DVB*, macroporous | 7.3 | No | 2.9 | No |
| Aldex WB-1 HC | PS/DVB*, macroporous | 6.9 | No | 2.2 | No |
| Amberlite FPA51 | PS/DVB*, macroporous | 5.8 | No | 2.3 | No |
| Bestion BCH-2 | PS/DVB*, macroporous | 6.9 | No | 2.2 | No |
| Aldex WB2 | PA**, gel | 4.7 | No | 2.3 | No |
| Amberlite FPA55 | PA**, gel | 5.9 | No | 2.1 | No |
| Amberlite MPR6700 | PA**, gel | 5.7 | No | 2.4 | No |
| Bestion BA765 | PA**, gel | 6.9 | No | 2.7 | No |
| Doshion: DAAR 412 | PA**, gel | 5.6 | No | 2.9 | No |
| Aldex CRA | PA** macroporous | 5.7 | No | 2.9 | No |
| Lewatit S5221 | PA** macroporous | 4.8 | No | 2.3 | No |

TABLE 7-continued

Efficacy of weak base anion exchange resins in SBEBCD purification

| Resin brand | Resin type | 4-hydroxybutane-1-sulfonic acid content | | bis(4-sulfobutyl) ether disodium content | |
|---|---|---|---|---|---|
| | | content (%) | USP compliance | content (%) | USP compliance |
| Lewatit A365 | PA** macroporous | 6.9 | No | 2.1 | No |
| Purolite A835 | PA** macroporous | 4.7 | No | 2.2 | No |

*PS/DVB: poly(styrene-co-divinylbenzene) scaffold
**PA: polyacrylate scaffold

EXAMPLE 9

Purification Process of SBEBCD Using Specialty Anion Exchange Resins

The efficacy of different specialty anion exchange resins sourced from different suppliers in the purification process is presented herein. The reaction mixture was prepared according to Example 1 and purified according to general scheme shown in Example 2 using different specialty resins. The results of analysis on the contents of 4-hydroxybutane-1-sulfonic acid and bis(4-sulfobutyl) ether disodium contents in the final product is shown in Table 8.

TABLE 8

Efficacy of specialty anion exchange resins in SBEBCD purification

| Resin brand | Resin type | 4-hydroxybutane-1-sulfonic acid content | | bis(4-sulfobutyl) ether disodium content | |
|---|---|---|---|---|---|
| | | content (%) | USP compliance | content (%) | USP compliance |
| Amberlite FPA54 | Weak base phenolic | 6.4 | No | 2.4 | No |
| Purolite MPR1000 | Mixture of acrylic and styrenic macroporous resin | 5.4 | No | 2.2 | No |
| Purolite S106 | Epoxy | 4.2 | No | 2.1 | No |
| Resintech SIR700 | Epoxypolyamine | 4.3 | No | 2.9 | No |
| Resintech WBG30 | Polyalkylamine | 4.4 | No | 2.2 | No |

EXAMPLE 10

Sulfobutylation Reaction of Alfa Cyclodextrin

The sulfobutylation reaction of alfa cyclodextrin was conducted in analogous manner as shown Example 1. Table 9 shows the quantities and the molar ratios of the starting materials:

TABLE 9 starting materials for sulfobutylation of alfa cyclodextrin

| | mass (kg) | molar quantity | molar ratio |
|---|---|---|---|
| alfa-cyclodextrin | 28.8 (calculated on dry basis) | 29.6 | 1 |
| sodium hydroxide | 9.2 | 230.0 | 7.8 |
| 1,4-butane sultone | 28.8 | 211.5 | 7.1 |

EXAMPLE 11

Purification Process of SBEACD Using Poly(styrene-co-divinylbenzene) Based, Gel Structured, Type II Strong Anion Exchange Resin The applicability of the purification process using the optimally selected ion exchange resin type is illustrated herein. The reaction mixture was prepared according to Example 10 and purified according to general scheme shown in Example 2 using different poly(styrene-co-divinylbenzene) based, gel structured, Type II strong anion exchange resins sourced from different suppliers. The results of analysis on the contents of 4-hydroxybutane-1-sulfonic acid and bis(4-sulfobutyl) ether disodium contents in the final product is shown in Table 10

TABLE 10

Efficacy of poly(styrene-co-divinylbenzene) based, gel structured, Type II strong base anion exchange resins in SBEACD purification

| Resin used | 4-hydroxybutane-1-sulfonic acid content | | bis(4-sulfobutyl) ether disodium content | |
|---|---|---|---|---|
| | content (%) | USP compliance* | content (%) | USP compliance* |
| Aldex SB-2 | <0.02% | Yes | <0.02% | Yes |
| Dow Amberlite HPR 4100 | <0.02% | Yes | <0.02% | Yes |
| Dowex Marathon A2 Upcore | <0.02% | Yes | <0.02% | Yes |

TABLE 10-continued

Efficacy of poly(styrene-co-divinylbenzene) based, gel structured, Type II strong base anion exchange resins in SBEACD purification

| Resin used | 4-hydroxybutane-1-sulfonic acid content | | bis(4-sulfobutyl) ether disodium content | |
|---|---|---|---|---|
| | content (%) | USP compliance* | content (%) | USP compliance* |
| Dowex mono A2-500 | <0.02% | Yes | <0.02% | Yes |
| Dowex MSA-2 | <0.02% | Yes | <0.02% | Yes |
| Rohm&Haas IRA-416 | <0.02% | Yes | <0.02% | Yes |
| Rohm&Haas Amberjet 4600 | <0.02% | Yes | <0.02% | Yes |
| Thermax Tulsion A-32 | <0.02% | Yes | <0.02% | Yes |
| Thermax Tulsion A-36 | <0.02% | Yes | <0.02% | Yes |
| Lanxess M-600 | <0.02% | Yes | <0.02% | Yes |
| Lanxess M-610 | <0.02% | Yes | <0.02% | Yes |
| Purolite A 200 | <0.02% | Yes | <0.02% | Yes |
| Purolite A 250 | <0.02% | Yes | <0.02% | Yes |
| Mitsubishi Diaion SA20A | <0.02% | Yes | <0.02% | Yes |
| Mitsubishi Diaion PA412 | <0.02% | Yes | <0.02% | Yes |

*Taken analogously from USP criteria set for SBEBCD

EXAMPLE 12

Sulfobutylation Reaction of Gamma Cyclodextrin

The sulfobutylation reaction of gamma cyclodextrin was conducted in analogous manner as shown Example 1. Table 11 shows the quantities and the molar ratios of the starting materials:

TABLE 11 starting materials for sulfobutylation of gamma cyclodextrin

| | mass (kg) | molar quantity | molar ratio |
|---|---|---|---|
| gamma-cyclodextrin | 38.1 (calculated on dry basis) | 29.4 | 1 |
| sodium hydroxide | 12.3 | 307.5 | 10.5 |
| 1,4-butane sultone | 38.4 | 282.0 | 9.6 |

EXAMPLE 13

Purification Process of SBEGCD Using Poly(styrene-co-divinylbenzene) Based, Gel Structured, Type II Strong Anion Exchange Resin The applicability of the purification process using the optimally selected ion exchange resin type is illustrated herein. The reaction mixture was prepared according to Example 12 and purified according to general scheme shown in Example 2 using different poly(styrene-co-divinylbenzene) based, gel structured, Type II strong anion exchange resins sourced from different suppliers. The results of analysis on the contents of 4-hydroxybutane-1-sulfonic acid and bis(4-sulfobutyl) ether disodium contents in the final product is shown in Table 12

TABLE 12

Efficacy of poly(styrene-co-divinylbenzene) based, gel structured, Type II strong base anion exchange resins in SBEGCD purification

| Resin used | 4-hydroxybutane-1-sulfonic acid content | | bis(4-sulfobutyl) ether disodium content | |
|---|---|---|---|---|
| | content (%) | USP compliance* | content (%) | USP compliance* |
| Aldex SB-2 | <0.02% | Yes | <0.02% | Yes |
| Dow Amberlite HPR 4100 | <0.02% | Yes | <0.02% | Yes |
| Dowex Marathon A2 Upcore | <0.02% | Yes | <0.02% | Yes |
| Dowex mono A2-500 | <0.02% | Yes | <0.02% | Yes |
| Dowex MSA-2 | <0.02% | Yes | <0.02% | Yes |
| Rohm&Haas IRA-416 | <0.02% | Yes | <0.02% | Yes |
| Rohm&Haas Amberjet 4600 | <0.02% | Yes | <0.02% | Yes |
| Thermax Tulsion A-32 | <0.02% | Yes | <0.02% | Yes |
| Thermax Tulsion A-36 | <0.02% | Yes | <0.02% | Yes |
| Lanxess M-600 | <0.02% | Yes | <0.02% | Yes |
| Lanxess M-610 | <0.02% | Yes | <0.02% | Yes |
| Purolite A 200 | <0.02% | Yes | <0.02% | Yes |
| Purolite A 250 | <0.02% | Yes | <0.02% | Yes |
| Mitsubishi Diaion SA20A | <0.02% | Yes | <0.02% | Yes |
| Mitsubishi Diaion PA412 | <0.02% | Yes | <0.02% | Yes |

*Taken analogously from USP criteria set for SBEBCD

What is claimed is:

1. A process for reducing the content of 4-hydroxybutane-1-sulfonic acid or sodium salt thereof in an aqueous sulfobutylether cyclodextrin solution, comprising:
   reducing the concentration of 4-hydroxybutane-1-sulfonic acid or sodium salt thereof by adding a combination of a cation exchange resin and a gel type anion exchange resin having dialkyl 2-hydroxyethyl ammonium hydroxide functionality on a poly(styrene-co-divinylbenzene) scaffold to the aqueous sulfobutylether cyclodextrin solution.

2. The process according to claim 1, wherein the sulfobutylether cyclodextrin is sulfobutylether beta cyclodextrin.

3. The process according to claim 2, wherein the anion exchange resin is in OH– form.

4. The process according to claim 2, wherein the cation exchange resin is in H$^+$ form.

5. A process for reducing the content of bis(4-sulfobutyl) ether disodium in aqueous sulfobutylether cyclodextrin sodium solution, comprising:
   reducing the concentration of bis(4-sulfobutyl) ether disodium by adding a combination of a cation exchange resin and a gel type anion exchange resin having dialkyl 2-hydroxyethyl ammonium hydroxide functionality on a poly(styrene-co-divinylbenzene) scaffold to the aqueous sulfobutylether cyclodextrin sodium solution.

6. The process according to claim 5, wherein the sulfobutylether cyclodextrin is sulfobutylether beta cyclodextrin.

7. The process according to claim 6, wherein the cation exchange resin is in H$^+$ form.

8. The process according to claim 6, wherein the anion exchange resin is in OH– form.

* * * * *